Dec. 3, 1935.   E. W. SEAHOLM   2,023,034
SHOCK ABSORBER
Filed Aug. 31, 1932   2 Sheets-Sheet 1
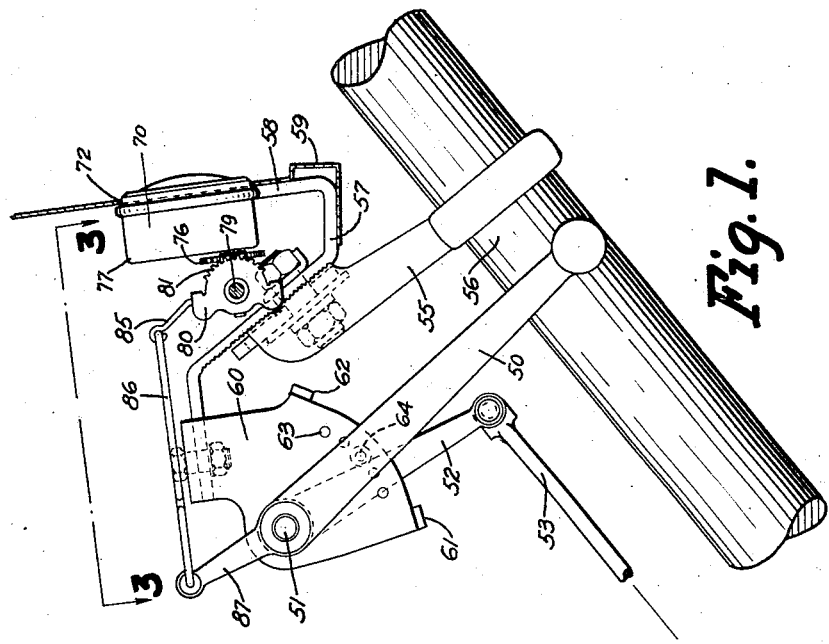
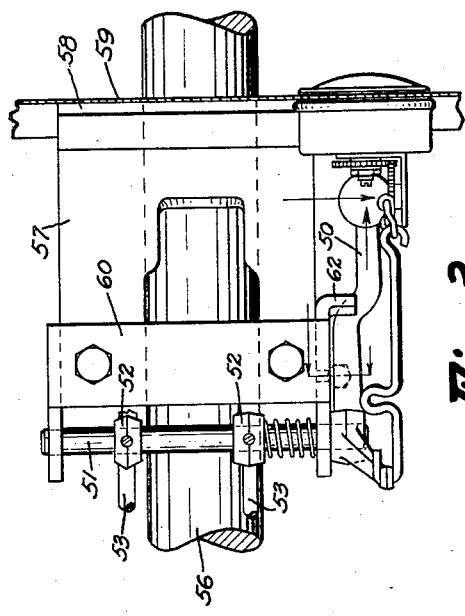
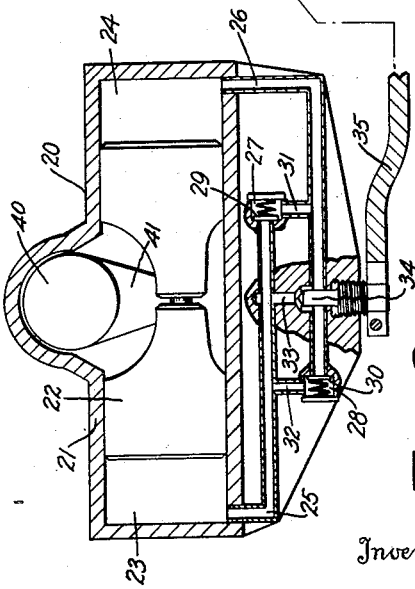
Inventor
ERNEST W. SEAHOLM
By Spencer, Hardman and Fehr
Attorneys Dec. 3, 1935.       E. W. SEAHOLM       2,023,034
SHOCK ABSORBER
Filed Aug. 31, 1932       2 Sheets-Sheet 2
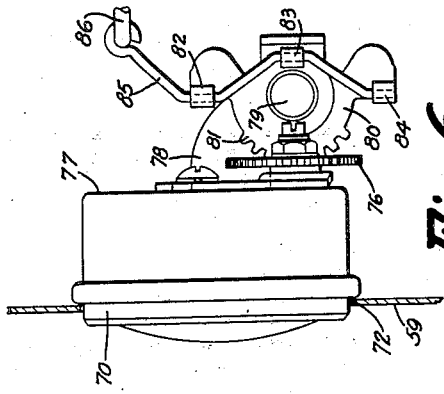
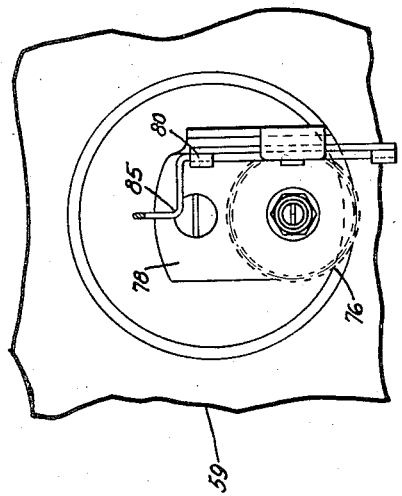
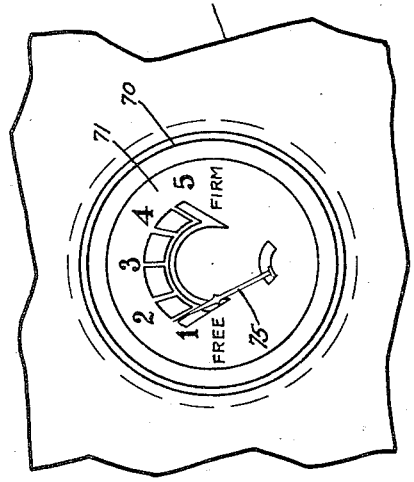
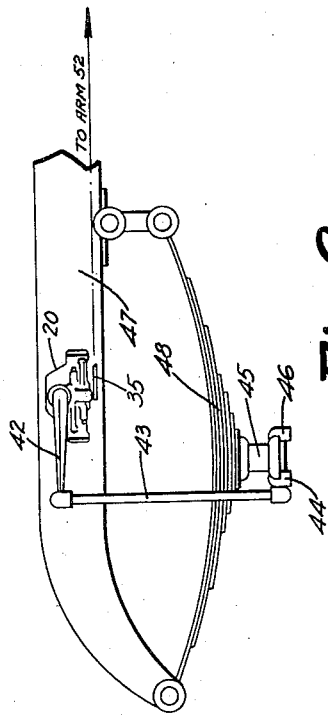
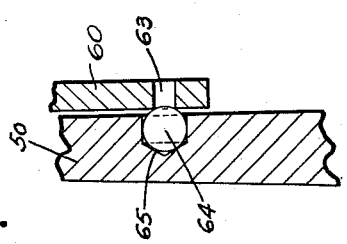
Inventor
ERNEST W. SEAHOLM

UNITED STATES PATENT OFFICE 2,023,034

SHOCK ABSORBER

Ernest W. Seaholm, Birmingham, Mich., assignor, by mesne assignments, to General Motors Corporation, Detroit, Mich., a corporation of Delaware Application August 31, 1932, Serial No. 631,165

5 Claims. (Cl. 74—491)

This invention relates to improvements in control devices for hydraulic shock absorbers on a vehicle chassis.

It is among the objects of the present invention to provide a control device for the hydraulic shock absorbers on the chassis of the vehicle with an indicating device viewable from the seat of the operator of the vehicle, said indicator showing to what degree the shock absorbers have been adjusted.

Further objects and advantages of the present invention will be apparent from the following description, reference being had to the accompanying drawings wherein a preferred embodiment of one form of the present invention is clearly shown.

In the drawings:

Fig. 1 is a side view of the shock absorber adjusting mechanism and the indicator as applied to a motor vehicle, only fragments of the motor vehicle being shown for the sake of clearness.

Fig. 2 is a diagrammatic, sectional view of one of the shock absorbers of the vehicle.

Fig. 3 is a plan view taken in the direction of the arrows 3—3 of Fig. 1.

Fig. 4 is a front view of the indicator.

Fig. 5 is a rear view of the indicator.

Fig. 6 is a full size side view of the indicator and its operating mechanism.

Fig. 7 is an enlarged detail view showing a ratchet mechanism provided on the shock absorber adjusting arm.

Fig. 8 is a fragmentary side view of the vehicle chassis showing a shock absorber applied thereto.

The present invention relates to a device for adjusting shock absorbers which are adapted to control the relative movements between the frame and axles of a vehicle, this device including an indicating mechanism adapted to be secured to the dashboard of the vehicle in sight of the operator's seat so that the operator may see to what extent he has adjusted the shock absorbers.

The shock absorbers themselves and the mechanism for adjusting said shock absorbers are substantially like that shown, described and claimed in the copending application of Verner P. Mathews, Serial No. 580,893, filed Dec. 14, 1931, the present invention residing in the combination with the shock absorber adjusting mechanism, of an indicating device attachable to the dash of the vehicle whereby the degree of adjustment of the shock absorbers is clearly indicated to the driver of the vehicle as he is seated in the driver's seat.

Referring to Fig. 2 of the drawings, the shock absorber is shown comprising a casing 20 providing a cylinder 21 in which a piston 22 is reciprocably supported. This piston 22 forms two compression chambers, one at each end of the cylinder, designated by the numerals 23 and 24. The chamber 23 may be termed the "spring compression control chamber," and the one designated by the numeral 24 may be termed the "spring rebound control chamber". The chambers 23 and 24 discharge into the respective ducts 25 and 26 which terminate in valve chambers 27 and 28 respectively. Valve chamber 27 has a spring-loaded valve 29 adapted normally to shut off communication between the duct 25 and chamber 27, while chamber 28 has a similar spring-loaded valve 30 adapted normally to shut off communication between duct 26 and the chamber 28. A passage 31 connects valve chamber 27 with the duct 26. A similar passage 32 connects the valve chamber 28 with the duct 25. An intermediate passage 33 connects ducts 25 and 26 between the valve chambers 27 and 28, an adjustable metering valve 34 controlling the fluid flow through the passage 33 in accordance with the adjustment of said metering valve. The valve 34 has an operating lever 35.

Within the shock absorber there is journalled a transverse shaft 40 having an interior arm 41 engaging the piston 22 to reciprocate it. One end of shaft 40 extends to the outside of the shock absorber and has the shock absorber operating arm 42 provided thereon, Fig. 8, the free end of which is swivelly connected with the one end of a link member 43, the opposite end of said link member being swivelly attached to arm 44 which is clamped to the vehicle axle 45 by clamping member 46. The frame 47 of the vehicle is supported upon the axle 45 by vehicle springs 48, the ends of which are hingedly secured to the frame 47 in any suitable manner.

It will be seen that movements of the axle 45 toward or away from the frame 47 will act through the link connection 43 and arm 44, shaft 40 and interior arm 41 to move the piston toward the left or right respectively as regards Fig. 2. This piston movement will in turn respectively urge fluid from chambers 23 and 24 into the ducts 25 and 26. Fluid flowing from duct 25 will first flow through the cross passage 33 through the orifice presented by the valve 34 in said passage 33 into the duct 26 to chamber 24, the fluid flow being restricted, of course, by the orifice provided in duct 33 by valve 34. The flow from chamber 34 through duct 26 will likewise be restricted in its flow through passage 33, into the duct 25 and chamber 23. The restriction to the fluid flow through the passage 33 may be varied by the operation of the arm 35 on valve 34 so that if the vehicle is being operated over a comparatively smooth highway, requiring little shock absorber resistance, valve 34 may be operated to decrease the restriction to the flow of fluid in passage 33 and thus decrease shock absorber resistance to axle and body movements, while if the vehicle is being operated over a comparatively rougher highway and more shock absorber action is required, the operator may adjust valves 34 of the respective shock absorbers to increase the restriction at their passages 33 and thus increase the resistance of the shock absorbers to body and axle movements.

A control lever 50 is provided for adjusting all of the shock absorbers simultaneously, this lever 50 being attached to the pivotal shaft 51 which has arms 52 attached thereto, said arms being connected with respective shock absorber adjusting levers 35 through rods 53.

In the present invention applicant provides a bracket 55 which is attached to the steering column 56 of the vehicle in any suitable manner. This bracket 55 supports another bracket 57, a portion 58 of which fits into the cowl or dashboard 59 of the vehicle. This bracket 57 supports another bracket 60 which in turn pivotally supports shaft 51 to which the lever 50 is attached. Two spaced, angular ears 61 and 62 are provided on the bracket 60, said ears acting as stops to limit the movement of the lever 50 in either direction. A plurality of equally spaced holes 63 are provided in the bracket 60 in a circular row concentric of the pivotal shaft 51, these holes being adapted to receive a ball ratchet 64 carried in a recess 65 of the lever 50. The ball 64 entering the various holes 63 provides indicating stops, yieldably tending to maintain the lever in any one of the five positions as indicated on the Fig. 1 of the drawings. The bracket 60 being yieldable will permit the ball 64 to move out of one hole 63 in said bracket into the next adjacent hole as the lever 50 is operated.

An indicator 70 is attached to the bracket 58 in such a manner that the dial 71 of said indicator will align with an opening 72 in the cowl or dashboard 59 of the vehicle. This dial has graduated numbers 1, 2, 3, 4, and 5 as shown in Fig. 4. A pointer 75 is provided in the indicator, said pointer being adapted to be moved from one number to another by the rotation of a gear 76 located outside the shell 77 of the indicator. A bracket 78 is secured to the rear end of the shell 77 of the indicator, this bracket supporting a shaft 79 upon which a gear segment 80 is rotatably carried. The teeth 81 of the gear segment 80 mesh with the teeth of gear 76 so that rotation of the segment 80 will rotate gear 76 and thus move the indicator pointer 75 across the dial 71. Tangs 82, 83, and 84 are provided on the gear segment 80, said tangs acting as securing members for the operating arms 85 of the indicator. Operating arm 85 has one end of a rod 86 attached thereto, the opposite end of this rod being secured to an arm 87 forming an extension of the operating lever 50.

In Fig. 4 the indicator is shown having the numerals 1 to 5. When the pointer is at the numeral 1 it indicates that the shock absorbers are adjusted to provide a free or substantially unresisted body and axle movement, while when the indicator pointer 75 is adjacent the numeral 5, the shock absorbers will be adjusted to provide their greatest resistance to body and axle movements. Thus when the operator wishes to adjust his shock absorbers to provide a soft or free ride such as is desirable over a comparatively rough boulevard or highway, he moves lever 50 downwardly or clockwise as regards Fig. 1, the rods 53 adjusting the valves 34 of all shock absorbers to reduce the restriction to fluid flow to the passages 33 of the respective shock absorbers, this movement of the lever 50 in a clockwise direction moving the gears 81 and 76 so that the indicator pointer 75 will be moved adjacent the numeral 1 as shown in Fig. 4. Now if the operator desires more resistance from the shock absorbers in order to control body and axle movements to a greater degree, lever 50 is pulled upwardly in a counter-clockwise direction and if the ratchet ball 64 enters the second hole counting from the bottom hole as shown in Fig. 1, then the indicator pointer 75 will have been moved to the numeral 2. If the lever 50 is moved to the extreme upper position in which the ratchet ball 64 thereof enters the uppermost hole in the bracket 60, then the shock absorber valves will have moved to provide the greatest restriction to the fluid flow from passage 33 and likewise the indicator pointer will have moved opposite the numeral 5 to indicate to the driver of the vehicle that the shock absorbers have been set to the highest point of body and axle control.

From the aforegoing it may be seen that applicant has provided an indicator in combination with the adjusting mechanism of the hydraulic shock absorbers whereby the operator may see exactly into what position the shock absorbers have last been operated and may thus move in one direction or the other in accordance with the ride desired.

While the form of embodiment of the present invention as herein disclosed, constitutes a preferred form, it is to be understood that other forms might be adopted, all coming within the scope of the claims which follow.

What is claimed is as follows:

1. A device for actuating the adjustable member of a shock absorber, the combination with a stationary bracket; a lever pivotally supported by said bracket and adapted to be connected with the member to be adjusted; and an indicator supported by said bracket, said indicator having an operating gear; a gear segment carried by the indicator so as to engage its gear; and a link operatively connected between the lever and gear segment.

2. An adjusting mechanism preferably adapted for a shock absorber, comprising, in combination, a stationary bracket; an indicator supported by the bracket and having a dial provided with spaced stations of indication; an indicator operating gear; a gear segment operatively engaging the said gear; a lever pivotally supported by the bracket and operatively connected to the member to be adjusted; a link connecting the said lever to the gear segment; a ball carried by the lever; and indents in the bracket for receiving the ball yieldably to hold the lever in a plurality of spaced stations of adjustment, said indents being spaced similarly to and coinciding with the stations of indications on the indicator dial.

3. In a device for actuating the adjustable member of a shock absorber, the combination with a stationary bracket, of an indicator rigidly carried by the bracket and having an operating gear segment rotatably supported thereon; an actuator pivotally secured to the bracket; and means connecting one portion of the actuator to the gear segment and another portion to the adjustable member of the shock absorber.

4. In a device for actuating the adjustable member of a shock absorber, the combination with a stationary bracket; of an indicator comprising a housing rigidly attached to said bracket and a rotatable actuating member; operating means for the indicator actuating member rotatably supported thereon; an actuator lever pivotally carried by the bracket; and links connecting different portions of the lever to the indicator operating means and the adjustable member of the shock absorber respectively.

5. In a device for actuating the adjustable member of a shock absorber, the combination with a stationary bracket; an indicator casing supported upon the bracket; an indicator actuator extending from said casing; a driving member pivotally carried by the bracket and operatively engaging the indicator actuator; means pivotally carried by the bracket and operatively connecting the indicator actuator and the adjustable member of the shock absorber; and an actuator lever supported by the bracket for operating the aforementioned means.

ERNEST W. SEAHOLM.